United States Patent
Aoki

(10) Patent No.: US 9,219,436 B2
(45) Date of Patent: Dec. 22, 2015

(54) DRIVING CONTROL DEVICE OF MOTOR

(71) Applicant: MINEBEA CO., LTD., Kitasaku-Gun, Nagano (JP)

(72) Inventor: Masato Aoki, Iwata (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 14/023,884

(22) Filed: Sep. 11, 2013

(65) Prior Publication Data
US 2014/0139153 A1 May 22, 2014

(30) Foreign Application Priority Data
Nov. 19, 2012 (JP) ................................. 2012-253700

(51) Int. Cl.
*H02P 6/00* (2006.01)
*H02P 1/00* (2006.01)
*H02P 6/14* (2006.01)
*H02P 6/22* (2006.01)

(52) U.S. Cl.
CPC . *H02P 6/145* (2013.01); *H02P 6/22* (2013.01)

(58) Field of Classification Search
USPC ........... 318/400.01, 400.02, 400.14, 729, 812
See application file for complete search history.

(56) References Cited

U.S. PATENT DOCUMENTS

| 4,701,687 A * | 10/1987 | Yoshimoto .................... 318/696 |
| 6,479,956 B1 * | 11/2002 | Kawabata et al. ........ 318/400.12 |
| 7,719,216 B2 * | 5/2010 | Sato et al. ................ 318/400.04 |
| 8,040,090 B2 * | 10/2011 | Kitagawa ................. 318/400.14 |
| 8,471,511 B2 * | 6/2013 | Kitagawa ...................... 318/432 |
| 2009/0267549 A1 | 10/2009 | Kitagawa |
| 2013/0285586 A1 * | 10/2013 | Koda et al. ............... 318/400.35 |

FOREIGN PATENT DOCUMENTS

JP 2009-268225 A 11/2009

* cited by examiner

*Primary Examiner* — Eduardo Colon Santana
*Assistant Examiner* — Bickey Dhakal
(74) *Attorney, Agent, or Firm* — Carrier Blackman & Associates, P.C.; Joseph P. Carrier; Jeffrey T. Gedeon

(57) ABSTRACT

A driving control device of a motor includes: a motor driving unit, which drives a motor in response to a driving control signal; and a control unit, which determines an energization pattern applied to an armature coil based on a detected rotational position of the rotor, wherein the control unit starts rotation control by a preset first energization pattern when activating of the motor, wherein when a predetermined time period has elapsed, the control unit adjusts energizing timing to be a timing, at which a short of each phase is not caused at switching of the energization pattern, and then outputs the driving control signal to the motor driving unit so that the rotation control is switched to rotation control of a second energization pattern, which has a predetermined advanced angle amount with respect to the first energization pattern.

4 Claims, 7 Drawing Sheets

DRIVING CONTROL DEVICE OF FIRST ILLUSTRATIVE EMBODIMENT

FIG. 3

TRUTH VALUES ILLUSTRATING TIME CHARTS
OF ENERGIZATION PATTERN A

| ELECTRICAL ANGLE | HALL SENSOR SIGNAL | | | DRIVING SIGNAL OF EACH PHASE | | | | | |
|---|---|---|---|---|---|---|---|---|---|
| (°) | HU | HV | HW | UH | UL | VH | VL | WH | WL |
| 0-60 | 1 | 1 | 0 | 1 | 0 | 0 | 1 | 0 | 0 |
| 60-120 | 1 | 0 | 0 | 1 | 0 | 0 | 0 | 0 | 1 |
| 120-180 | 1 | 0 | 1 | 0 | 0 | 1 | 0 | 0 | 1 |
| 180-240 | 0 | 0 | 1 | 0 | 1 | 1 | 0 | 0 | 0 |
| 240-300 | 0 | 1 | 1 | 0 | 1 | 0 | 0 | 1 | 0 |
| 300-360 | 0 | 1 | 0 | 0 | 0 | 0 | 1 | 1 | 0 |

FIG. 5

TRUTH VALUES ILLUSTRATING TIME CHARTS
OF ENERGIZATION PATTERN B

| ELECTRICAL ANGLE (°) | HALL SENSOR SIGNAL | | | DRIVING SIGNAL OF EACH PHASE | | | | | |
|---|---|---|---|---|---|---|---|---|---|
| | HU | HV | HW | UH | UL | VH | VL | WH | WL |
| 0-60 | 1 | 1 | 0 | 1 | 0 | 0 | 0 | 0 | 1 |
| 60-120 | 1 | 0 | 0 | 0 | 0 | 1 | 0 | 0 | 1 |
| 120-180 | 1 | 0 | 1 | 0 | 1 | 1 | 0 | 0 | 0 |
| 180-240 | 0 | 0 | 1 | 0 | 1 | 0 | 0 | 1 | 0 |
| 240-300 | 0 | 1 | 1 | 0 | 0 | 0 | 1 | 1 | 0 |
| 300-360 | 0 | 1 | 0 | 1 | 0 | 0 | 1 | 0 | 0 |

# DRIVING CONTROL DEVICE OF MOTOR

CROSS-REFERENCE TO RELATED APPLICATION

This application claims priority from Japanese Patent Application No. 2012-253700 filed on Nov. 19, 2012, the entire subject matter of which is incorporated herein by reference.

TECHNICAL FIELD

This disclosure relates to a driving control device of rotating a motor.

BACKGROUND

A driving control device of a motor such as a brushless motor energizes an armature coil of each phase of the motor in accordance with a position of a rotor being rotated. Therefore, the driving control device of the motor uses a rotational position detector such as a Hall sensor, for example, and detects a rotor position, based on an output signal from the rotational position detector. Then, the driving control device of a motor sets a pattern (energization pattern), which is energized to each phase of the motor, based on the detected rotor position, and thus it controls the rotation of the rotor.

Also, the driving control device of a motor performs advanced angle control to match a phase of an induced voltage and a phase of current of the motor in the armature coil in order to correct a relative error of an attachment position of the Hall sensor or to maximize torque of the motor.

When the driving control device of the motor performs the advanced angle control, if the motor is activated with an energization pattern highly deviated from an appropriate advanced angle position, an unstable operation such as rotation of the motor in an unintended direction may be caused. Here, JP-2009-268225 discloses a control device that switches energization patterns when activating of a motor and after the motor reaches a predetermined rotation speed, so as to stabilize rotation driving upon low speed rotation just after the motor is activated.

The abstract of JP-2009-268225 describes, as a problem to be solved, "to provide a brushless motor control device capable of stabilizing rotation driving with simple control, particularly rotation driving upon low speed rotation just after activation", and, as a solving means, "a drive timing generation unit 16 generates a normal energizing timing and a 120-degrees advanced angle energizing timing, based on a rotational position (detection signals from Hall elements Hu, Hv, Hw) of a rotor 10a, and a control unit 17 generates a delay amount relative to the 120-degrees advanced angle energizing timing in accordance with a rotation speed of the rotor 10a. When the rotation speed of the rotor 10a is below a predetermined rotation speed, the control unit 17 performs rotation control under the normal energizing timing. When the rotation speed of the rotor 10a is the predetermined rotation speed or greater, the rotation control is switched to rotation control under the advanced angle energizing timing, in which the delay amount is reflected."

SUMMARY

The control device disclosed in JP-2009-268225 once stops the energization to the motor when switching the energization pattern. The reason is to prevent a short of an element of each phase or malfunction of the rotation control due to a mixing of the energization patterns around the switching when switching the energization pattern.

However, when the control device once stops the energization to the motor, torque and rotating speed of the motor are decreased. When the control device resumes the energization, an abnormal noise is generated in the motor.

Also, the control device disclosed in JP-2009-268225 switches the energization pattern, based on a detection result of the rotation speed. Accordingly, a circuit for monitoring the rotation speed of the rotor is required, which increases the cost.

This disclosure provides at least a driving control device of a motor capable of suppress an abnormality when switching of an energization pattern.

In view of the above, a driving control device of a motor in this disclosure, comprises a motor driving unit, which receives power from a power supply and drives a motor in response to a driving control signal; and a control unit, which detects a rotational position of a rotor based on a detection signal from a rotation sensor and determines an energization pattern applied to an armature coil based on the detected rotational position of the rotor, wherein the control unit starts rotation control by a preset first energization pattern when activating of the motor, wherein when a predetermined time period has elapsed since the motor is activated, the control unit adjusts energizing timing to be a timing, at which a short of each phase is not caused at switching of the energization pattern, and then outputs the driving control signal to the motor driving unit so that the rotation control is switched to rotation control of a second energization pattern, which has a predetermined advanced angle amount with respect to the first energization pattern.

Therefore, the motor control unit switches the energization pattern from the first energization pattern to the second energization pattern at energizing timing at which a short of each phase is not caused, without stopping the energization. Thereby, it is possible to suppress inconveniences such as malfunction of the rotation control, decreases in the rotation speed and torque of the motor, abnormal noise and the like. Additionally, the other means will be described in the below illustrative embodiments.

BRIEF DESCRIPTION OF THE DRAWINGS

The foregoing and additional features and characteristics of this disclosure will become more apparent from the following detailed descriptions considered with the reference to the accompanying drawings, wherein:

FIG. 3 is a view illustrating truth values of the first energization pattern A in the first illustrative embodiment;

FIG. 5 is a view illustrating truth values of the second energization pattern B in the first illustrative embodiment;

DETAILED DESCRIPTION

Hereinafter, illustrative embodiments of this disclosure will be specifically described with reference to the respective drawings.

(Configuration of First Illustrative Embodiment)

Figure 1:
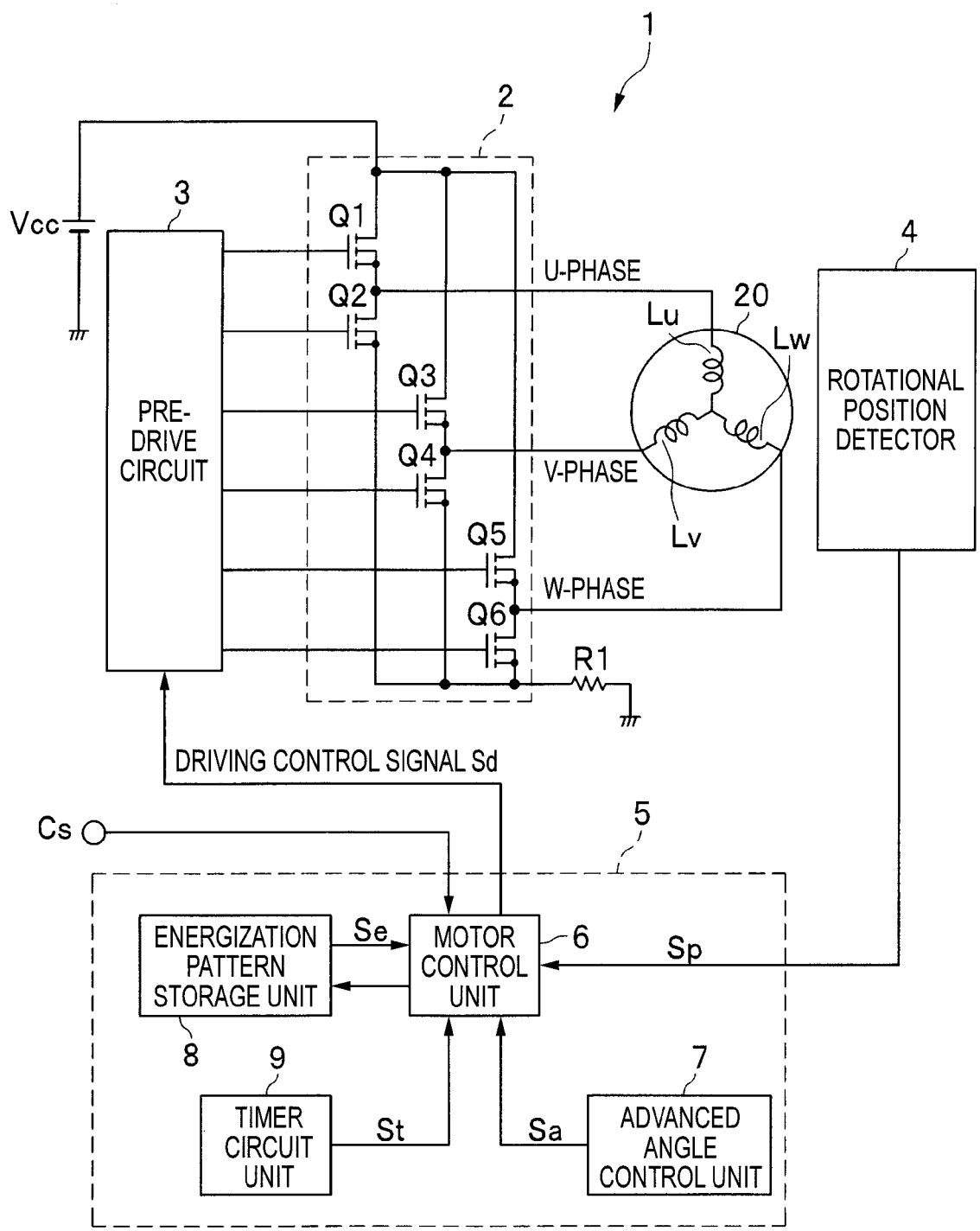
FIG. 1 is a schematic configuration diagram illustrating a driving control device of a brushless motor in a first illustrative embodiment.

FIG. 1 is a schematic configuration diagram illustrating a driving control device 1 of a brushless motor 20 in a first illustrative embodiment.

The driving control device 1 of the brushless motor 20 has an inverter circuit 2, a pre-drive circuit 3, a rotational position detector 4, a control circuit unit 5 and a resistor element R1.

The driving control device 1 is connected to a power supply Vcc, is connected to the brushless motor 20 by three phases of a U-phase wiring, a V-phase wiring and a W-phase wiring and is also connected to the rotational position detector 4.

The driving control device 1 is to control the rotation of the brushless motor 20. The driving control device 1 outputs three-phase alternating current to the brushless motor 20.

The inverter circuit 2 has, as switching elements Q1 to Q6, six FETs (Field Effect Transistors), for example. The inverter circuit 2 has a U-phase switching leg, a V-phase switching leg and a W-phase switching leg. The inverter circuit 2 is connected to the power supply Vcc and is also connected to a direct current ground via the resistor element R1.

The U-phase switching leg has a switching element Q1 at an upper arm-side and a switching element Q2 at a lower arm-side. A drain terminal of the switching element Q1 is connected to the power supply Vcc. A source terminal of the switching element Q1 outputs a U-phase alternating current signal and is connected to a drain terminal of the switching element Q2. A source terminal of the switching element Q2 is connected to the direct current ground via the resistor element R1. A gate terminal of the switching element Q1 is input with a driving signal UH (refer to chart (D) of FIG. 2). A gate terminal of the switching element Q2 is input with a driving signal UL (refer to chart (E) of FIG. 2).

The V-phase switching leg has a switching element Q3 at an upper arm-side and a switching element Q4 at a lower arm-side. A drain terminal of the switching element Q3 is connected to the power supply Vcc. A source terminal of the switching element Q3 outputs a V-phase alternating current signal and is connected to a drain terminal of the switching element Q4. A source terminal of the switching element Q4 is connected to the direct current ground via the resistor element R1. A gate terminal of the switching element Q3 is input with a driving signal VH (refer to chart (F) of FIG. 2). A gate terminal of the switching element Q4 is input with a driving signal VL (refer to chart (G) of FIG. 2).

The W-phase switching leg has a switching element Q5 at an upper arm-side and a switching element Q6 at a lower arm-side. A drain terminal of the switching element Q5 is connected to the power supply Vcc. A source terminal of the switching element Q5 outputs a W-phase alternating current signal and is connected to a drain terminal of the switching element Q6. A source terminal of the switching element Q6 is connected to the direct current ground via the resistor element R1. A gate terminal of the switching element Q5 is input with a driving signal WH (refer to chart (H) of FIG. 2). A gate terminal of the switching element Q6 is input with a driving signal WL (refer to chart (I) of FIG. 2).

That is, the inverter circuit 2 has the switching elements Q1, Q3, and Q5 at an upper arm-side connected between respective phases of respective armature coils Lu, Lv, and Lw of the brushless motor 20 and one terminal of the power supply Vcc and the switching elements Q2, Q4, and Q6 at a lower arm-side connected between the respective phases of the respective armature coils Lu, Lv, and Lw and the ground terminal of the power supply Vcc via the resistor element R1.

When the inverter circuit 2 receives power from the power supply Vcc and is input with driving signals UH, UL, VH, VL, WH, and WL corresponding to a driving control signal Sd, it enables three-phase alternating current to flow through the U-phase wiring, the V-phase wiring and the W-phase wiring of the brushless motor 20.

The pre-drive circuit 3 has six gate drive circuits, for example. When the pre-drive circuit 3 is input with a driving control signal Sd, it generates driving signals UH, UL, VH, VL, WH, and WL corresponding to the driving control signal Sd and outputs the same to the inverter circuit 2.

In this illustrative embodiment, the inverter circuit 2 and the pre-drive circuit 3 are corresponding to a motor driving unit that receives power from the power supply Vcc and drives the brushless motor 20 in response to the driving control signal Sd.

The rotational position detector 4 detects a rotational position of a rotor (not shown) of the brushless motor 20. The rotational position detector 4 has a combination of three pairs of Hall sensors and an amplifier, generates three detection signals HU, HV, and HW (pulse signals; refer to charts (A), (B) and (C) of FIG. 2), which are obtained by amplifying signals of the respective Hall sensors, and outputs the same to a motor control unit 6 of the control circuit unit 5, as rotational position signals Sp.

The control circuit unit 5 (control unit) has the motor control unit 6, an advanced angle control unit 7, an energization pattern storage unit 8 and a timer circuit unit 9. The control circuit unit 5 is connected to the rotational position detector 4, is connected to an external device (not shown) to be thus with a speed indication signal Cs and is connected to the pre-drive circuit 3 to thus output a driving control signal Sd. The control circuit unit 5 (control unit) is a microcomputer having a ROM (Read Only Memory) and a RAM (Random Access Memory), which are not shown, and reads out and executes a program recorded in the ROM to thereby implement the motor control unit 6, the advanced angle control unit 7, the energization pattern storage unit 8 and the timer circuit unit 9.

When activating of the brushless motor 20, the motor control unit 6 starts rotation control by a preset first energization pattern A. When a predetermined time period has elapsed since, when switching of the energization pattern, the motor control unit 6 adjusts energizing timing to a timing at which a short of each phase is not caused and then outputs a driving control signal Sd to the pre-drive circuit 3 so that the rotation control is switched to rotation control of a second energization pattern B having a predetermined advanced angle amount with respect to the first energization pattern A.

When the control circuit unit 5 is input with a speed indication signal Cs, which indicates a rotation speed of the brushless motor 20, from an external device (not shown), it outputs a driving control signal Sd to the pre-drive circuit 3 to thereby rotate the brushless motor 20.

The advanced angle control unit 7 stores advanced angle value information in which a speed indication signal Cs and an advanced angle value are associated. Also, an advanced angle value of the brushless motor 20 is a value that indicates a rotational position of the rotor (not shown) of the brushless motor 20 with an electrical angle. The advanced angle control unit 7 outputs the advanced angle value information to the motor control unit 6, as an advanced angle control signal Sa.

The timer circuit unit 9 is to measure time and to output a result of the measuring of the time to the motor control unit 6 as measured time information St.

The motor control unit 6 receives the speed indication signal Cs, which indicates the rotation speed of the brushless motor 20, outputs the driving control signal Sd to the pre-drive circuit 3 and performs control so that the rotation speed of the brushless motor 20 becomes an indicated speed. The motor control unit 6 generates the driving control signal Sd, based on the received speed indication signal Cs and the advanced angle control signal Sa acquired from the advanced angle control unit 7. In this illustrative embodiment, the driving control signal Sd is a PWM (Pulse Width Modulation) signal. The motor control unit 6 checks whether a predetermined time period has elapsed based on the measured time information St, selects any one energization pattern from the energization pattern storage unit 8 based on a result of the check, and thus outputs the driving control signal Sd corresponding to the selected energization pattern to the pre-drive circuit 3.

The energization pattern storage unit 8 stores the first energization pattern A (refer to FIGS. 2 and 3) and the second energization pattern B (refer to FIGS. 4 and 5), which are the two preset energization patterns. The energization pattern storage unit 8 outputs any one of the two energization patterns to the motor control unit 6, as energization pattern information Se. The second energization pattern B has a phase that is more advanced by an electrical angle of 60° than the first energization pattern A. The second energization pattern B has a predetermined advanced angle amount with respect to the first energization pattern A. Herein, the advanced angle amount means a difference of advanced angle values.

When activating of the brushless motor 20, the control circuit unit 5 starts the rotation control by the preset first energization pattern A. Then, when a predetermined time period has elapsed and the rotation speed of the brushless motor 20 is thus increased, the control circuit unit 5 switches to energizing timing at which a short of each phase is not generated, and then outputs a driving control signal Sd to the pre-drive circuit 3 so that the rotation control is switched to rotation control of a second energization pattern B having a predetermined advanced angle amount with respect to the first energization pattern A. Thereby, it is possible to improve a driving efficiency of the brushless motor 20.

Here, the predetermined time period is preset elapsed time after the rotation control by the first energization pattern A starts or time reaching a preset number of energization switching times thereafter.

The brushless motor 20 has the armature coils Lu, Lv, and Lw. One ends of the armature coils Lu, Lv, and Lw are Y-connected. The other end of the armature coil Lu is connected to a U-phase, the other end of the armature coil Lv is connected to a V-phase and the other end of the armature coil Lw is connected to a W-phase. When the three-phase alternating current is input to the U-phase, the V-phase and the W-phase from the inverter circuit 2, the brushless motor 20 is rotated.

The power supply Vcc is a constant voltage source. The power supply Vcc stabilizes direct current power, which is fed from a direct current power supply, for example, to a constant voltage and feeds the direct current power to the driving control device 1. The power supply Vcc is connected to the inverter circuit 2 and is also connected to each unit of the driving control device 1 through wirings (not shown).

Figure 2:
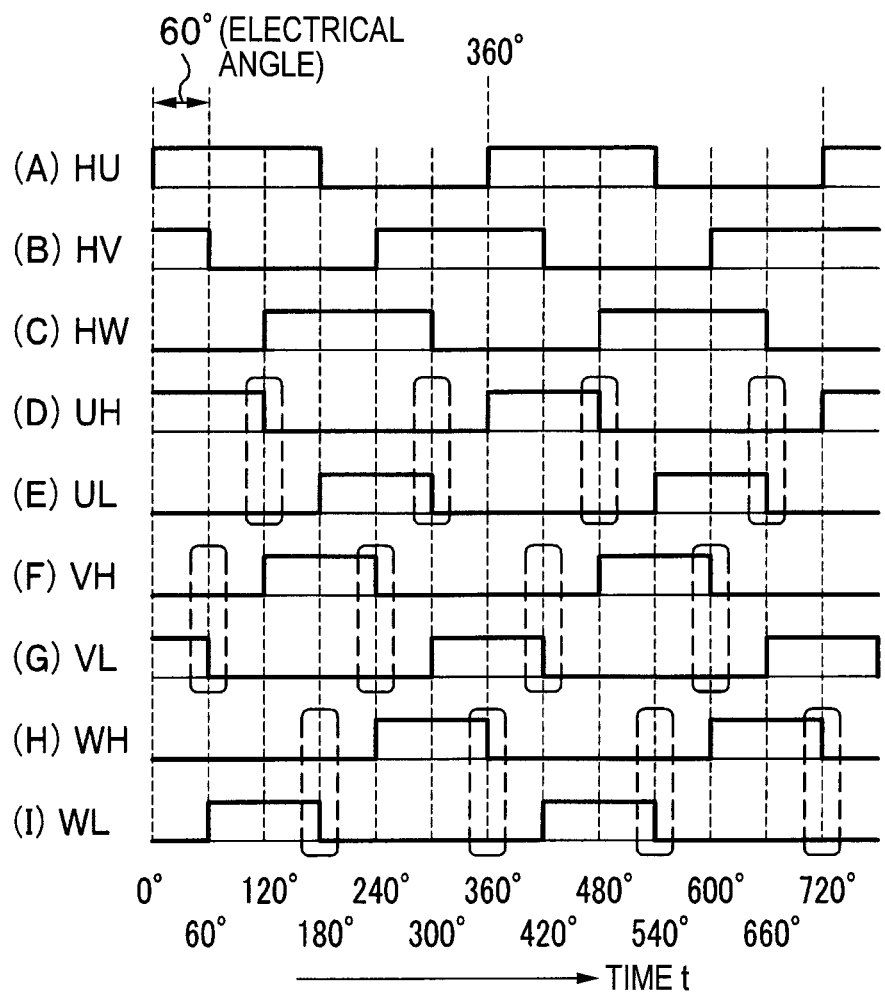
FIG. 2 is waveform diagrams illustrating time charts of a first energization pattern A in the first illustrative embodiment.

Charts (A) to (I) of FIG. 2 are waveform diagrams illustrating time charts of the first energization pattern A in the first illustrative embodiment. In the figures, a horizontal axis commonly indicates time having an electrical angle as a unit. In the figures, a vertical axis indicates whether a signal is an H (High) level or an L (Low) level.

When the energization is performed with the first energization pattern A or second energization pattern B, the motor control unit 6 generates a PWM signal having a predetermined ON duty as a driving signal when a truth value of a driving signal corresponding to the energization pattern is 1 and generates a signal of an L level as a driving signal when a truth value of a driving signal corresponding to the energization pattern is 0.

The second energization pattern B has a phase that is more advanced by an electrical angle of 60° than the first energization pattern A.

Chart (A) of FIG. 2 illustrates a time chart of a detection signal HU. The detection signal HU is an H (High) level when an electrical angle is 0° to 180°, and it is an L (Low) level when an electrical angle is 180° to 360°. The detection signal HU has edges when an electrical angle is 0°, 180° and 360°.

Chart (B) of FIG. 2 illustrates a time chart of a detection signal HV.

The detection signal HV is an H level when an electrical angle is 0° to 60°, it is an L level when an electrical angle is 60° to 240°, and it is an H level when an electrical angle is 240° to 360°. The detection signal HV has edges when an electrical angle is 60° and 240°.

Chart (C) of FIG. 2 illustrates a time chart of a detection signal HW.

The detection signal HW is an L level when an electrical angle is 0° to 120°, it is an H level when an electrical angle is 120° to 300°, and it is an L level when an electrical angle is 300° to 360°. The detection signal HW has edges when an electrical angle is 120° and 300°.

Chart (D) of FIG. 2 illustrates a time chart of a driving signal UH.

The driving signal UH is an H level when an electrical angle is 0° to 120°, and it is an L level when an electrical angle is 120° to 360°.

Chart (E) of FIG. 2 illustrates a time chart of a driving signal UL. The driving signal UL is an L level when an electrical angle is 0° to 180°, it is an H level when an electrical angle is 180° to 300°, and it is an L level when an electrical angle is 300° to 540°.

Charts (D) and (E) of FIG. 2 illustrate that broken-line areas are indicated in the vicinity of electrical angles of 120°, 300°, 480° and 660°.

The broken-line area in the vicinity of the electrical angle of 120° and the broken-line area in the vicinity of the electrical angle of 480° are areas in which a falling edge of the driving signal UH and a rising edge of the driving signal UL are temporally adjacent when the motor control unit 6 changes the energization pattern to the second energization pattern B. At this time, the switching elements Q1 and Q2 of the U-phase may be ON at the same time and through-current may flow, depending on a variation in an OFF delay (switching delay time) of the switching element Q1 or an ON delay (switching delay time) of the switching element Q2.

The broken-line area in the vicinity of the electrical angle of 300° and the broken-line area in the vicinity of the electrical angle of 660° are areas in which a rising edge of the driving signal UH and a falling edge of the driving signal UL are temporally adjacent when the motor control unit 6 changes the energization pattern to the second energization pattern B. At this time, the switching elements Q1 and Q2 of the U-phase may be ON at the same time and through-current may flow, depending on a variation in an ON delay of the switching element Q1 or an OFF delay of the switching element Q2.

Also, there are edges of the detection signal HW at the electrical angles of 120°, 300°, 480° and 660°.

Chart (F) of FIG. 2 illustrates a time chart of a driving signal VH.

The driving signal VH is an L level when an electrical angle is 0° to 120°, it is an H level when an electrical angle is 120° to 240°, and it is an L level when an electrical angle is 240° to 480°.

Chart (G) of FIG. 2 illustrates a time chart of a driving signal VL. The driving signal VL is an H level when an electrical angle is 0° to 60°, it is an L level when an electrical angle is 60° to 300°, and it is an H level when an electrical angle is 300° to 420°.

Charts (F) and (G) of FIG. 2 illustrate that broken-line areas are indicated in the vicinity of electrical angles of 60°, 240°, 420° and 600°.

The broken-line area in the vicinity of the electrical angle of 60° and the broken-line area in the vicinity of the electrical angle of 420° are areas in which a rising edge of the driving signal VH and a falling edge of the driving signal VL are temporally adjacent when the motor control unit 6 changes the energization pattern to the second energization pattern B. At this time, the switching elements Q3 and Q4 of the V-phase may be ON at the same time and through-current may flow, depending on a variation in an ON delay of the switching element Q3 or an OFF delay of the switching element Q4.

The broken-line area in the vicinity of the electrical angle of 240° and the broken-line area in the vicinity of the electrical angle of 600° are areas in which a falling edge of the driving signal VH and a rising edge of the driving signal VL are temporally adjacent when the motor control unit 6 changes the energization pattern to the second energization pattern B. At this time, the switching elements Q3 and Q4 of the V-phase may be ON at the same time and through-current may flow, depending on a variation in an OFF delay of the switching element Q3 or an ON delay of the switching element Q4.

Also, there are edges of the detection signal HV at the electrical angles of 60°, 240°, 420° and 600°.

Chart (H) of FIG. 2 illustrates a time chart of a driving signal WH.

The driving signal WH is an L level when an electrical angle is 0° to 240°, and it is an H level when an electrical angle is 240° to 360°.

Chart (I) of FIG. 2 illustrates a time chart of a driving signal WL.

The driving signal WL is an L level when an electrical angle is 0° to 60°, it is an H level when an electrical angle is 60° to 180°, and it is an L level when an electrical angle is 180° to 360°.

Charts (H) and (I) of FIG. 2 illustrate that broken-line areas are indicated in the vicinity of electrical angles of 180°, 360°, 540° and 720°.

The broken-line area in the vicinity of the electrical angle of 180° and the broken-line area in the vicinity of the electrical angle of 540° are areas in which a rising edge of the driving signal WH and a falling edge of the driving signal WL are temporally adjacent when the motor control unit 6 changes the energization pattern to the second energization pattern B. At this time, the switching elements Q5 and Q6 of the W-phase may be ON at the same time and through-current may flow, depending on a variation in an ON delay of the switching element Q5 or an OFF delay of the switching element Q6.

The broken-line area in the vicinity of the electrical angle of 360° and the broken-line area in the vicinity of the electrical angle of 720° are areas in which a falling edge of the driving signal WH and a rising edge of the driving signal WL are temporally adjacent when the motor control unit 6 changes the energization pattern to the second energization pattern B. At this time, the switching elements Q5 and Q6 of the W-phase may be ON at the same time and through-current may flow, depending on a variation in an OFF delay of the switching element Q5 or an ON delay of the switching element Q6.

Also, there are edges of the detection signal HV at the electrical angles of 180°, 360°, 540° and 720°.

The first energization pattern A is set so that both the switching elements at the lower arm-side and the lower arm-side of each phase are not ON at the same time. The first energization pattern A is also set so that the edge of the driving signal relating to the upper arm-side of each phase and the edge of the driving signal relating to the lower arm-side thereof are not to be temporally adjacent.

However, if the switching from the first energization pattern A to the second energization pattern B is made in the temporal vicinity of the edges of the detection signals HU, HV, and HW, the edge of the driving signal relating to the upper arm-side of each phase and the edge of the driving signal relating to the lower arm-side thereof may are temporally adjacent. At this time, the switching element at the upper arm-side and the switching element at the lower arm-side may be ON at the same time and through-current may flow, depending on a variation in an ON/OFF delay of the switching element relating to the upper arm-side or an ON/OFF delay of the switching element.

FIG. 3 is a view illustrating truth values of the first energization pattern A in the first illustrative embodiment. Each row of FIG. 3 indicates an electrical angle. Each column of FIG. 3 indicates each signal.

A truth value of the detection signal HU of the first energization pattern A is 1 when an electrical angle is 0° to 180°, and it is 0 when an electrical angle is 180° to 360°.

A truth value of the detection signal HV of the first energization pattern A is 1 when an electrical angle is 0° to 60°, it is 0 when an electrical angle is 60° to 240°, and it is 1 when an electrical angle is 240° to 360°.

A truth value of the detection signal HW of the first energization pattern A is 0 when an electrical angle is 0° to 120°, it is 1 when an electrical angle is 120° to 300° and it is 0 when an electrical angle is 300° to 360°.

A truth value of the driving signal UH of the first energization pattern A is 1 when an electrical angle is 0° to 120°, and it is 0 when an electrical angle is 120° to 360°.

A truth value of the driving signal UL of the first energization pattern A is 0 when an electrical angle is 0° to 180°, it is 1 when an electrical angle is 180° to 300°, and it is 0 when an electrical angle is 300° to 360°.

A truth value of the driving signal VH of the first energization pattern A is 0 when an electrical angle is 0° to 120°, it is 1 when an electrical angle is 120° to 240°, and it is 0 when an electrical angle is 240° to 360°.

A truth value of the driving signal VL of the first energization pattern A is 1 when an electrical angle is 0° to 60°, it is 0 when an electrical angle is 60° to 300°, and it is 1 when an electrical angle is 300° to 360°.

A truth value of the driving signal WH of the first energization pattern A is 0 when an electrical angle is 0° to 240°, and it is 1 when an electrical angle is 240° to 360°.

A truth value of the driving signal WL of the first energization pattern A is 0 when an electrical angle is 0° to 60°, it is 1 when an electrical angle is 60° to 180°, and it is 0 when an electrical angle is 180° to 360°.

Figure 4:
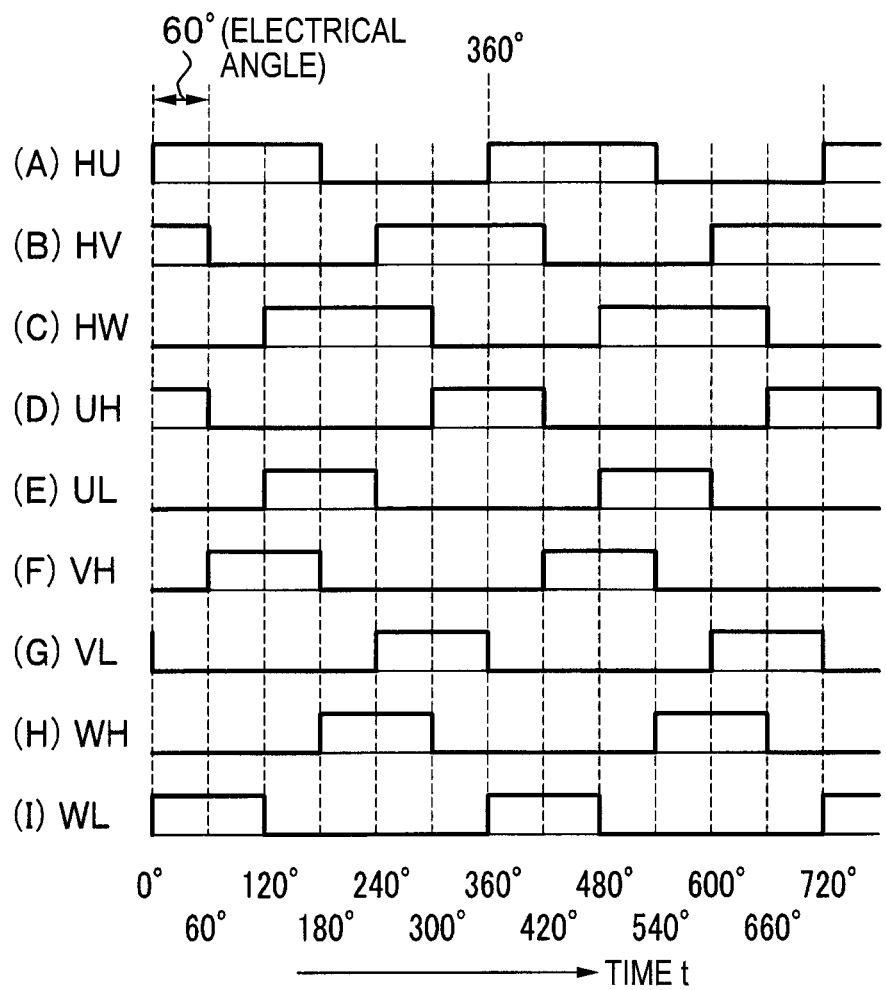
FIG. 4 is waveform diagrams illustrating time charts of a second energization pattern B in the first illustrative embodiment.

Charts of (A) to (I) of FIG. 4 are waveform diagrams illustrating time charts of the second energization pattern B in the first illustrative embodiment. In the figures, a horizontal axis commonly indicates time having an electrical angle as a unit.

In the figures, a vertical axis indicates whether a signal is an H (High) level or an L (Low) level.

Chart (A) of FIG. 4 illustrates a time chart of a detection signal HU.

The time chart of the detection signal HU of the second energization pattern B is the same as the time chart of the detection signal HU (chart (A) of FIG. 2) of the first energization pattern A.

Chart (B) of FIG. 4 illustrates a time chart of a detection signal HV.

The time chart of the detection signal HV of the second energization pattern B is the same as the time chart of the detection signal HV (chart (B) of FIG. 2) of the first energization pattern A.

Chart (C) of FIG. 4 illustrates a time chart of a detection signal HW.

The time chart of the detection signal HW of the second energization pattern B is the same as the time chart of the detection signal HW (chart (C) of FIG. 2) of the first energization pattern A.

Chart (D) of FIG. 4 illustrates a time chart of a driving signal UH.

The driving signal UH is an H level when an electrical angle is 0° to 60°, it is an L level when an electrical angle is 60° to 300°, and it is an H level when an electrical angle is 300° to 420°. Also, a phase of the driving signal UH of the second energization pattern B is more advanced only by an electrical angle of 60° than a phase of the driving signal UH (refer to chart (D) of FIG. 2) of the first energization pattern A.

Chart (E) of FIG. 4 illustrates a time chart of a driving signal UL. The driving signal UL is an L level when an electrical angle is 0° to 120°, it is an H level when an electrical angle is 120° to 240°, and it is an L level when an electrical angle is 240° to 480°. Also, a phase of the driving signal UL of the second energization pattern B is more advanced only by an electrical angle of 60° than a phase of the driving signal UL (refer to chart (E) of FIG. 2) of the first energization pattern A.

Chart (F) of FIG. 4 illustrates a time chart of a driving signal VH.

The driving signal VH is an L level when an electrical angle is 0° to 60°, it is an H level when an electrical angle is 60° to 180°, and it is an L level when an electrical angle is 180° to 420°. Also, a phase of the driving signal VH of the second energization pattern B is more advanced only by an electrical angle of 60° than a phase of the driving signal VH (refer to chart (F) of FIG. 2) of the first energization pattern A.

Chart (G) of FIG. 4 illustrates a time chart of a driving signal VL.

The driving signal VL is an L level when an electrical angle is 0° to 240°, and it is an H level when an electrical angle is 240° to 360°. Also, a phase of the driving signal VL of the second energization pattern B is more advanced only by an electrical angle of 60° than a phase of the driving signal VL (refer to chart (G) of FIG. 2) of the first energization pattern A.

Chart (H) of FIG. 4 illustrates a time chart of a driving signal WH.

The driving signal WH is an L level when an electrical angle is 0° to 180°, it is an H level when an electrical angle is 180° to 300°, and it is an L level when an electrical angle is 300° to 540°. Also, a phase of the driving signal WH of the second energization pattern B is more advanced only by an electrical angle of 60° than a phase of the driving signal WH (refer to chart (H) of FIG. 2) of the first energization pattern A.

Chart (I) of FIG. 4 illustrates a time chart of a driving signal WL.

The driving signal WL is an H level when an electrical angle is 0° to 120°, and it is an L level when an electrical angle is 120° to 360°. Also, a phase of the driving signal WL of the second energization pattern B is more advanced only by an electrical angle of 60° than a phase of the driving signal WL (refer to chart (I) of FIG. 2) of the first energization pattern A.

The second energization pattern B is set so that both the switching elements at the upper arm-side and the lower arm-side of each phase are not ON at the same time. The second energization pattern B is also set so that the edge of the driving signal relating to the upper arm-side of each phase and the edge of the driving signal relating to the lower arm-side are not to be temporally adjacent.

FIG. 5 is a view illustrating truth values of the second energization pattern B in the first illustrative embodiment. Each row of FIG. 5 indicates an electrical angle. Each column of FIG. 5 indicates each signal.

Truth values of the detection signal HU of the second energization pattern B are the same as the truth values (refer to FIG. 3) of the detection signal HU of the first energization pattern A.

Truth values of the detection signal HV of the second energization pattern B are the same as the truth values (refer to FIG. 3) of the detection signal HV of the first energization pattern A.

Truth values of the detection signal HW of the second energization pattern B are the same as the truth values (refer to FIG. 3) of the detection signal HW of the first energization pattern A.

A truth value of the driving signal UH of the second energization pattern B is 1 when an electrical angle is 0° to 60°, it is 0 when an electrical angle is 60° to 300°, and it is 1 when an electrical angle is 300° to 360°.

A truth value of the driving signal UL of the second energization pattern B is 0 when an electrical angle is 0° to 120°, it is 1 when an electrical angle is 120° to 240°, and it is 0 when an electrical angle is 240° to 360°.

A truth value of the driving signal VH of the second energization pattern B is 0 when an electrical angle is 0° to 60°, it is 1 when an electrical angle is 60° to 180°, and it is 0 when an electrical angle is 180° to 360°.

A truth value of the driving signal VL of the second energization pattern B is 0 when an electrical angle is 0° to 240°, and it is 1 when an electrical angle is 240° to 360°.

A truth value of the driving signal WH of the second energization pattern B is 0 when an electrical angle is 0° to 180°, it is 1 when an electrical angle is 180° to 300°, and it is 0 when an electrical angle is 300° to 360°.

A truth value of the driving signal WL of the second energization pattern B is 1 when an electrical angle is 0° to 120°, and it is 0 when an electrical angle is 120° to 360°.

According to the truth values of FIG. 5, in the first illustrative embodiment, the second energization pattern B has a phase that is more advanced only by an electrical angle of 60° than the first energization pattern A.

(Operations of First Illustrative Embodiment)

Figure 6:
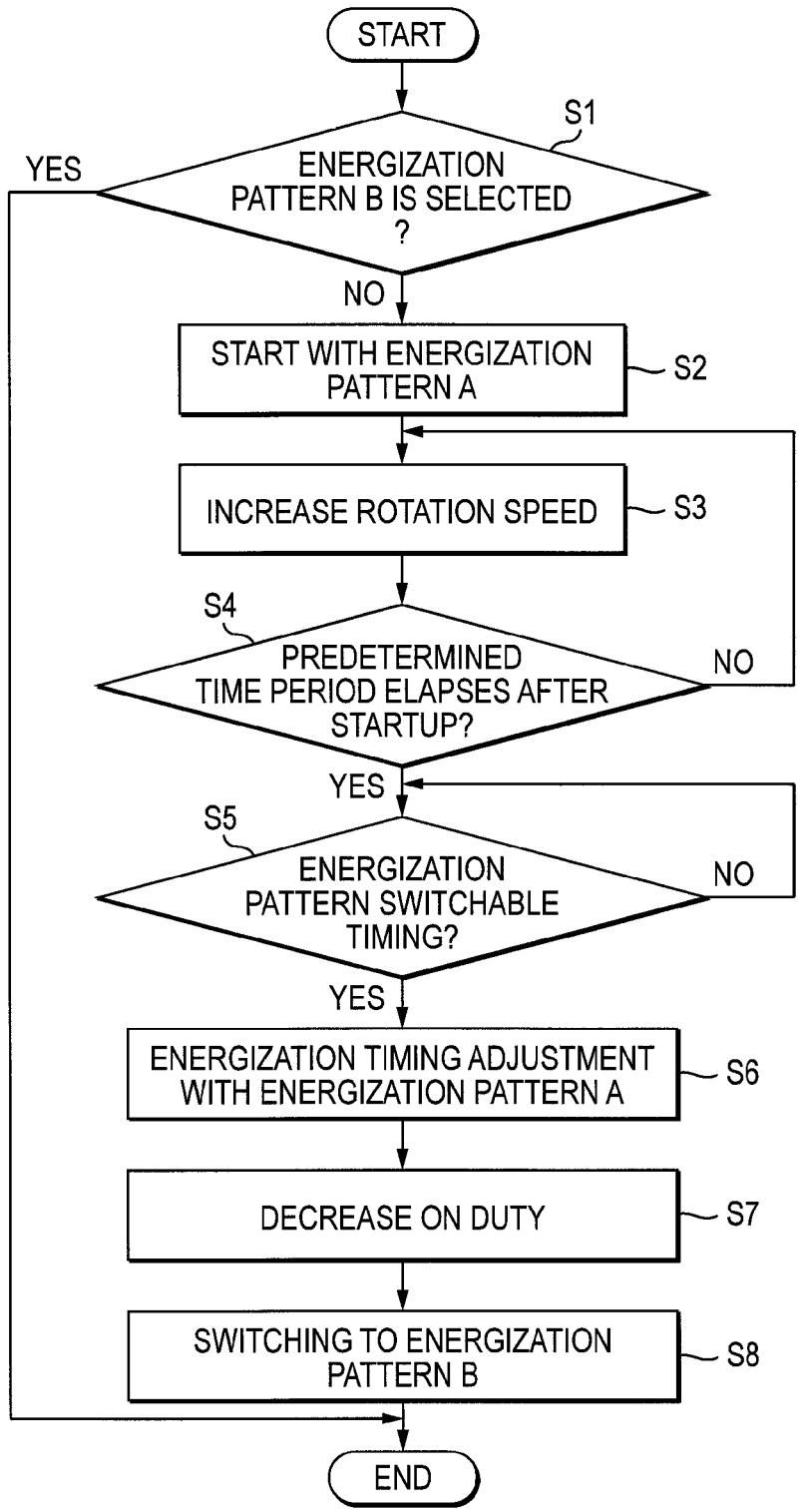
FIG. 6 is a flowchart illustrating processing of switching an energization pattern by a motor control unit in the first illustrative embodiment.

FIG. 6 is a flowchart illustrating processing of switching an energization pattern by the motor control unit 6.

When the driving control device 1 is activated and the speed indication signal Cs is received, the motor control unit 6 starts activating processing of the brushless motor 20.

In step S1, the motor control unit 6 determines whether the selected energization pattern is the second energization pattern B. When it is determined that the corresponding determination condition is satisfied (YES), the motor control unit 6 ends the processing of FIG. 6. When it is determined that the corresponding determination condition is not satisfied (NO), the motor control unit 6 performs processing of step S2.

In step S2, the motor control unit 6 starts to activate the brushless motor 20 with the first energization pattern A. That is, the motor control unit 6 acquires the energization pattern information Se, which indicates the first energization pattern A, from the energization pattern storage unit 8. Based on the acquired energization pattern information Se, the motor control unit 6 generates a driving control signal Sd energizing with the first energization pattern A at a predetermined ON duty of a PWM signal and outputs the same to the pre-drive circuit 3.

The ON duty of the PWM signal is determined based on the specification of the brushless motor 20 and the like, for example.

In step S3, the motor control unit 6 increases the rotation speed of the brushless motor 20. The motor control unit 6 continues the energization with the first energization pattern A without changing the ON duty of the PWM signal.

In step S4, the motor control unit 6 determines whether a predetermined time period has elapsed after the activation of the brushless motor 20, based on the measured time information St acquired from the timer circuit unit 9. When it is determined that the corresponding determination condition is satisfied (YES), the motor control unit 6 performs processing of step S5. When it is determined that the corresponding determination condition is not satisfied (NO), the motor control unit 6 performs the processing of step S3. Here, the activation of the brushless motor 20 means that the energization starts with the first energization pattern A.

Here, the predetermined time period means elapsed time after the energization pattern starts with the first energization pattern A, for example, and is determined based on the specification of the motor and the like, for example.

In step S5, the motor control unit 6 determines whether it is in an energization pattern switchable timing. When it is determined that the corresponding determination condition is satisfied (YES), the motor control unit 6 performs processing of step S6. When it is determined that the corresponding determination condition is not satisfied (NO), the motor control unit 6 again performs the processing of step S5. Here, the energization pattern switchable timing means timing at which an edge (rising or falling) of any one of the detection signals HU, HV, and HW is detected. For example, when the predetermined time period has elapsed at a state where the electrical angle is larger than 60° and smaller than 120°, the energization pattern switchable timing is detection timing (when the electrical angle becomes 120°) of a rising edge of the detection signal HW that is first detected after the predetermined time period has elapsed.

In step S6, the motor control unit 6 advances the phases of the respective driving signals of the first energization pattern A only by an electrical angle of 60°. The motor control unit 6 outputs the driving control signal Sd containing the respective driving signals UH, UL, VH, VL, WH, and WL to the pre-drive circuit 3.

In step S7, the motor control unit 6 decreases the ON duty of the PWM signal in the first energization pattern A and outputs a driving control signal Sd having the PWM signal of the decreased ON duty to the pre-drive circuit 3. Here, a decrease amount of the ON duty of the PWM signal is an ON duty of the PWM signal at a steady state where the brushless motor 20 is rotated at target rotation speed after the switching to the second energization pattern B.

In step S8, the motor control unit 6 outputs the driving control signal Sd switched to the second energization pattern B to the pre-drive circuit 3. Here, the motor control unit 6 acquires the energization pattern information Se relating to the second energization pattern B from the energization pattern storage unit 8 and outputs the driving control signal Sd energizing with the second energization pattern B to the pre-drive circuit 3, based on the acquired energization pattern information Se. When the processing of step S8 is over, the motor control unit 6 ends the processing of FIG. 6.

When the processing of switching the energization pattern is end, the motor control unit 6 performs control so that the brushless motor 20 reaches a predetermined rotation speed, based on the speed indication signal Cs.

For example, in step S5, it is assumed that the motor control unit 6 detects a falling edge of the detection signal HV. At this time, the timing of the brushless motor 20 corresponds to time at which the electrical angle is 60° in the time chart of FIG. 2. After detecting the falling edge of the detection signal HV, the motor control unit 6 executes the processing of step S6.

In step S6, the motor control unit 6 adjusts the energizing timing and advances the phases of the driving signals UH, UL, VH, VL, WH, and WL of the first energization pattern A only by the electrical angle of 60°. The energizing timing is adjusted based on the advanced angle control signal Sa of the advanced angle control unit 7, for example. At this time, since the timing of the rotor of the brushless motor 20 is the electrical angle of 60° to 120°, the motor control unit 6 adjusts the energizing timing based on the first energization pattern A to the electrical angle of 120° to 180° and generates the driving signals UH, UL, VH, VL, WH, and WL.

By the processing of step S6, the driving signal UH is changed from the H level to the L level. The driving signal UL is kept at the L level. An edge of the driving signal UL is not generated and is not adjacent to the edge of the driving signal UH. Therefore, a short does not occur by the switching element Q1 at the upper arm-side of the U-phase and the switching element Q2 at the lower arm-side of the U-phase, so that the through-current does not flow through the U-phase switching leg.

Further, by the processing of step S6, the driving signal VH is changed from the L level to the H level. The driving signal VL is kept at the L level. An edge of the driving signal VL is not generated and is not temporally adjacent to the edge of the driving signal VH. Therefore, a short does not occur by the switching element Q3 at the upper arm-side of the V-phase and the switching element Q4 at the lower arm-side of the V-phase, so that the through-current does not flow through the V-phase switching leg.

Also, by the processing of step S6, the driving signal WH is kept at the L level. The driving signal WL is kept at the H level. An edge is not generated in the driving signals WH and WL. Therefore, a short does not occur by the switching element Q5 at the upper arm-side of the W-phase and the switching element Q6 at the lower arm-side of the W-phase, so that the through-current does not flow through the V-phase switching leg.

In step S7, the motor control unit 6 decreases the ON duty of the PWM signal in the first energization pattern A and outputs a driving control signal Sd having the PWM signal of the decreased ON duty to the pre-drive circuit 3.

In step S8, the motor control unit 6 outputs the driving control signal Sd switched to the second energization pattern B to the pre-drive circuit 3.

Accordingly, the motor control unit 6 switches the energization pattern from the first energization pattern A to the second energization pattern B at energizing timing at which the upper-lower short of the switching elements of each phase is not caused, without once stopping the energization to the brushless motor 20. Therefore, the motor control unit 6 can suppress the through-current from flowing through the arms of each phase and safely switch the energization pattern from the first energization pattern A to the second energization pattern B. Also, the motor control unit 6 can suppress the rapid speed change (acceleration) of the brushless motor 20, which is accompanied by the switching to the second energization pattern B.

(Effects of First Illustrative Embodiment)

In the first illustrative embodiment, following effects (A) to (E) can be realized.

(A) When activating of the brushless motor 20 starts up, the motor control unit 6 starts the rotation control by the preset first energization pattern A. When switching of the energization pattern, the motor control unit 6 adjusts the energizing timing to the energizing timing at which a short of each phase is not caused and then outputs the driving control signal Sd to the pre-drive circuit 3 so that the rotation control is switched to the rotation control of the second energization pattern B having a predetermined advanced angle amount with respect to the first energization pattern A. Thereby, the motor control unit 6 can safely switch the energization pattern from the first energization pattern A to the second energization pattern B at energizing timing at which the upper-lower short of the switching elements of each phase is not caused, without stopping the energization.

(B) When activating of the brushless motor 20, the motor control unit 6 starts the rotation control by the preset first energization pattern A and then switches the rotation control to the rotation control of the second energization pattern B when the predetermined time period has elapsed. Thereby, since the motor control unit 6 performs the rotation control by the first energization pattern A when activating of the brushless motor 20, it is possible to suppress an unstable operation such as rotation of the motor in an unintended direction. Also, since the motor control unit 6 performs the rotation control by the second energization pattern B, which is the most suitable for the normal rotation, upon normal rotation, it is possible to maximize torque of the motor.

(C) The motor control unit 6 switches the energization pattern from the first energization pattern A to the second energization pattern B without stopping the energization. Thereby, the motor control unit 6 can suppress the inconveniences such as malfunction of the rotation control, the decrease in the rotation speed of the brushless motor 20, the decrease in the torque of the brushless motor 20, the abnormal noise from the brushless motor 20 and the like, before happens.

(D) The predetermined time period after the control circuit unit 5 activates the brushless motor 20 until the switching to the second energization pattern B is made is the preset elapsed time after the rotation control by the first energization pattern A starts or the time reaching a preset number of energization switching times thereafter. Therefore, it is not necessary to provide the motor control unit 6 with a circuit for monitoring the rotation speed, which simplifies the circuit and reduces the cost.

(E) When switching the energization pattern from the first energization pattern A to the second energization pattern B, the motor control unit 6 is configured to decrease the ON duty of the PWM signal with respect to that just before the switching of the energization pattern. Thereby, when switching to the second energization pattern B, the motor control unit 6 can suppress the rapid speed change (acceleration).

(Configuration of Second Illustrative Embodiment)

Figure 7:
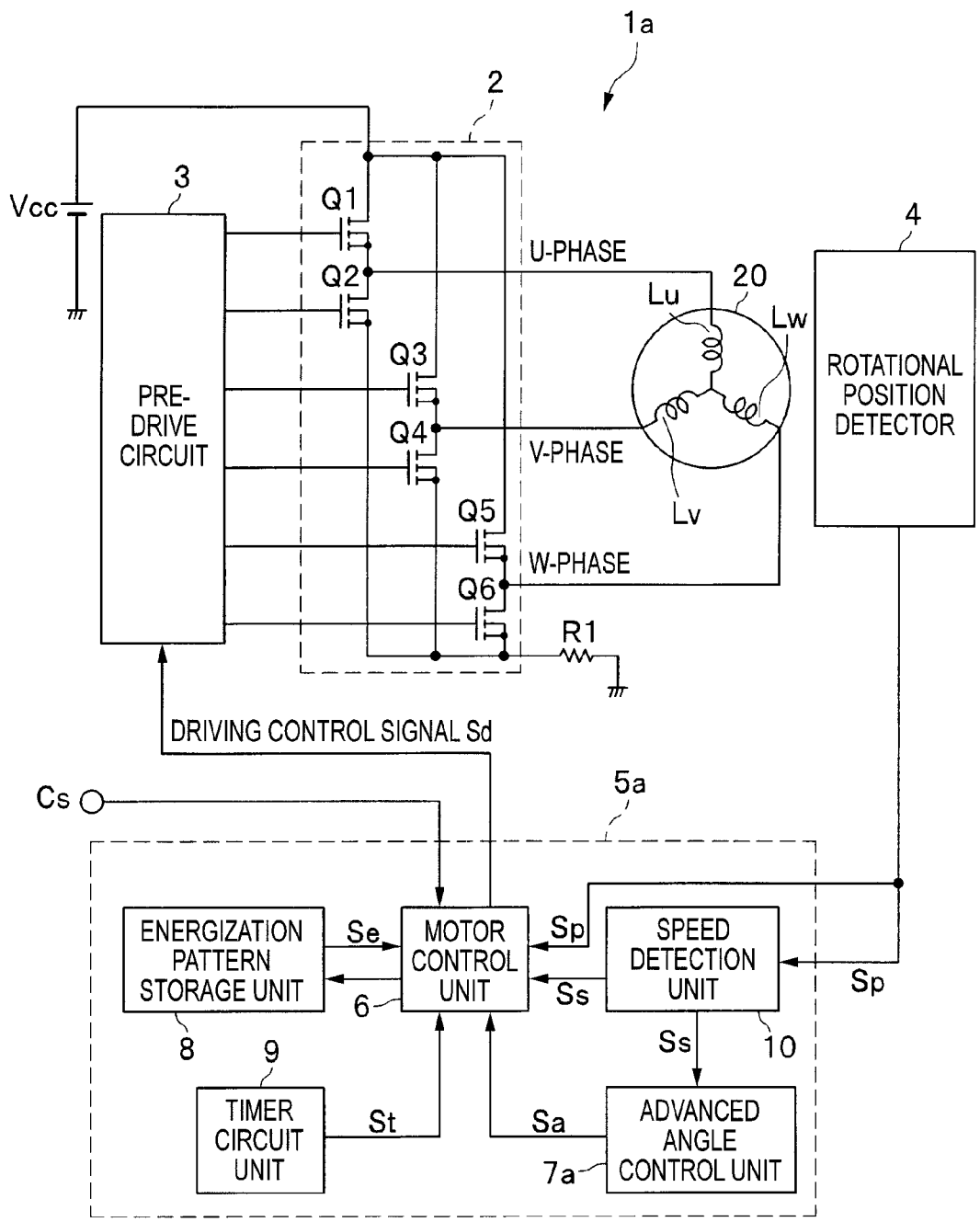
FIG. 7 is a schematic configuration diagram illustrating a driving control device of a brushless motor in a second illustrative embodiment.

FIG. 7 is a schematic configuration diagram illustrating a driving control device 1a of the brushless motor 20 in a second illustrative embodiment. The same elements as those of the driving control device 1 (refer to FIG. 1) of the first illustrative embodiment are denoted with the same reference numerals.

The driving control device 1a of the second illustrative embodiment has a control circuit unit 5a, instead of the control circuit unit 5 (refer to FIG. 1) of the first illustrative embodiment. Other than that, the driving control device 1a has the same configuration as the driving control device 1 (refer to FIG. 1) of the first illustrative embodiment.

The control circuit unit 5a has an advanced angle control unit 7a, instead of the advanced angle control unit 7 (refer to FIG. 1) of the first illustrative embodiment, and further has a speed detection unit 10. Other than that, the control circuit unit 5a has the same configuration as the control circuit unit 5 (refer to FIG. 1) of the first illustrative embodiment.

The speed detection unit 10 detects the rotation speed of the brushless motor 20, based on the rotational position signal Sp from the rotational position detector 4, and outputs a rotation speed signal Ss. The speed detection unit 10 is connected to the rotational position detector 4 and is input with the rotational position signal Sp. The speed detection unit 10 outputs the rotation speed signal Ss, which indicates the detected speed, to the motor control unit 6 and the advanced angle control unit 7a.

The advanced angle control unit 7a has advanced angle information corresponding to the rotation speed signal Ss, inputs the rotation speed signal Ss and outputs an advanced angle control signal Sa so that an optimal advanced angle amount corresponding to the current speed is made.

The advanced angle control unit 7a associates the rotation speed of the brushless motor 20 and an advanced angle value. The advanced angle control unit 7a stores therein advanced angle value information in which the rotation speed signal Ss and the advanced angle value are associated. The advanced angle control unit 7a outputs the advanced angle control signal Sa to the motor control unit 6 so that an optimal advanced angle amount corresponding to the current speed is made, based on the rotation speed signal Ss.

The motor control unit 6 compares the speed indication signal Cs and the rotation speed signal Ss to thus adjust the ON duty of the PWM signal of the driving control signal Sd and outputs the same to the pre-drive circuit 3, thereby controlling the brushless motor 20 to reach designated rotation speed.

(Effects of Second Illustrative Embodiment)

(In the second illustrative embodiment, a following effect (F) can be realized in addition to the same effects as the first illustrative embodiment.

(F) The driving control device 1a has the speed detection unit 10 and performs the feedback control such as the speed control, the advanced angle control and the like of the brushless motor 20 by using the rotation speed signal Ss. Thereby, it is possible to correctly perform the switching to the second energization pattern B and to precisely set the decrease amount of the ON duty of the PWM signal.

(Modified Embodiments)

This disclosure is not limited to the above illustrative embodiments and can be changed without departing from the scope of this disclosure. For example, following modified embodiments (a) to (k) can be made.

(a) In the above illustrative embodiments, the number of phases of the brushless motor 20 is three phases. However, this disclosure is not limited thereto. For example, the number of phase of the brushless motor 20 may be three or more phases.

(b) The type of the motor that is controlled by the driving control devices 1, 1a is not limited to the brushless motor.

(c) The type of the switching elements Q1 to Q6 is not limited to the FET and may be any type of a switching element. For example, regarding the switching element, an IGBT (Insulated Gate Bipolar Transistor) and the like may be also adopted.

(d) The first energization pattern A and the second energization pattern B are not limited to the specific examples of FIGS. 2 to 5. It is sufficient that the second energization pattern B has a phase that is more advanced by an electrical angle of an angle or greater corresponding to the minimum interval than the first energization pattern A.

(e) The advanced angle control units 7, 7a are not limited to the configurations of the above illustrative embodiments. A target parameter for setting an advanced angle value may be arbitrarily set, based on a preset fixed value, a rotation speed to be detected, a motor current to be detected, a rotation indication speed and the like.

(f) The flowchart of FIG. 6 is a specific example and this disclosure is not limited thereto. For example, another processing may be inserted between the respective steps.

(g) In step S4 of the flowchart illustrated in FIG. 6, the predetermined time period may be time at which the number of energization switching times by preset ON/OFF reaches the predetermined number of times, other than the preset time. Also, the predetermined number of times may be determined, based on the specification of the motor and the like, for example.

(h) In step S6 of the flowcharts illustrated in FIG. 6, the motor control unit 6 outputs the driving control signal Sd, which advances the electrical angle by 60°, to the pre-drive circuit 3 and switches the energization pattern in step S8. However, regarding the control method enabling the motor control unit 6 to switch the energization pattern, any control method may be possible insomuch as an H level is not made at the same time in any one of the driving signals UH and UL, the driving signals VH and VL and the driving signals WH and WL and the edges of the driving signals relating to the switching legs of the same phase are not to be temporally adjacent.

(i) The driving control signal Sd is the PWM signal. However, this disclosure is not limited thereto. For example, the driving control signal Sd may be any pulse modulation signal such as a PFM (Pulse Frequency Modulation) signal, a PDM (Pulse Density Modulation) signal and the like.

(j) In the energization pattern A, the motor control unit 6 advances the electrical angles of all phases. However, this disclosure is not limited thereto. For example, only for a phase in which an edge of a driving signal occurs, the motor control unit 6 may advance an electrical angle of the phase.

(k) In the energization pattern A, the motor control unit 6 advances the electrical angles of all phases. However, this disclosure is not limited thereto. For example, only for a phase in which an edge of a driving signal occurs, the motor control unit 6 may make an energization pattern of the phase OFF.

What is claimed is:

1. A driving control device of a motor, comprising:
a motor driving unit, which receives power from a power supply and drives a motor in response to a driving control signal; and
a control unit, which detects a rotational position of a rotor based on a detection signal from a rotation sensor and determines an energization pattern applied to an armature coil based on the detected rotational position of the rotor, wherein the control unit starts rotation control by a preset first energization pattern when activating of the motor,
wherein when a predetermined time period has elapsed since the motor is activated, the control unit determines whether it is an energization pattern switchable timing, which is a timing at which a rising or falling edge of the detection signal is detected and, at which a short of each phase is not caused at switching of the energization pattern, and if it is determined that it is the energization pattern switchable timing, outputs the driving control signal to the motor driving unit so that the rotation control is switched to rotation control of a second energization pattern, wherein the first energization pattern and the second energization pattern are stored in an energization pattern storage unit, with a phase of the first energization pattern being different from a phase of the second energization pattern, and the second energization pattern a predetermined advanced electrical angle amount with respect to the first energization pattern,
wherein the motor driving unit controls driving current flowing through the motor by a PWM signal, which is generated therein, and
wherein the control unit controls the motor driving unit so that, just before switching the energization pattern from the first energization pattern to the second energization pattern, an ON duty of the PWM signal in the first energization pattern is set to be lower than an ON duty of the PWM signal just before the switching and then the energization pattern is switched from the first energization pattern to the second energization pattern.

2. The driving control device of a motor according to claim 1,
wherein the predetermined time period is one of a preset elapsed time after the rotation control by the first energization pattern starts or a time at which a preset number of energization switching is performed.

3. The driving control device of a motor according to claim 1,
wherein the control unit comprises:
an energization pattern storage unit, which stores therein the first energization pattern and the second energization pattern;
a timer circuit unit, which measures time and outputs measured time information based on a result of the measuring of the time; and
a motor control unit, which checks whether the predetermined time period has elapsed based on the measured time information, selects any one energization pattern from the energization pattern storage unit based on a result of the check and outputs the driving control signal corresponding to the selected energization pattern.

4. The driving control device of a motor according to claim 1,
wherein the control unit controls the motor driving unit so that, just before switching the energization pattern from the first energization pattern to the second energization pattern, an ON duty of the PWM signal in the first energization pattern is set to be an ON duty at the steady state where the motor is rotated at a target rotation speed after the switching to the second energization pattern.

* * * * *